US011216280B2

(12) United States Patent
Craske

(10) Patent No.: US 11,216,280 B2
(45) Date of Patent: Jan. 4, 2022

(54) EXCEPTION INTERCEPTION

(71) Applicant: Arm Limited, Cambridge (GB)

(72) Inventor: Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 108 days.

(21) Appl. No.: 16/695,745

(22) Filed: Nov. 26, 2019

(65) Prior Publication Data

US 2021/0157601 A1    May 27, 2021

(51) Int. Cl.
*G06F 9/38* (2018.01)
*G06F 9/30* (2018.01)

(52) U.S. Cl.
CPC ........ *G06F 9/3861* (2013.01); *G06F 9/30101* (2013.01)

(58) Field of Classification Search
CPC ............. G06F 9/3861; G06F 2209/481; G06F 2009/45587; G06F 9/3863
USPC ........................................................ 712/244
See application file for complete search history.

(56) References Cited

U.S. PATENT DOCUMENTS

| 6,216,222 B1* | 4/2001 | Hinds .................... G06F 9/3836 |
| | | 712/222 |
| 7,418,584 B1* | 8/2008 | Klaiber ................ G06F 9/45533 |
| | | 712/229 |
| 2003/0018681 A1* | 1/2003 | Subramanian ........ G06F 9/3861 |
| | | 718/102 |
| 2004/0139346 A1* | 7/2004 | Watt ........................ G06F 21/74 |
| | | 713/166 |
| 2004/0153672 A1* | 8/2004 | Watt ..................... G06F 9/30123 |
| | | 726/22 |
| 2010/0287414 A1* | 11/2010 | Pardoe ................ G06F 11/0778 |
| | | 714/38.1 |
| 2011/0209219 A1* | 8/2011 | Zeitlin .................... G06F 21/56 |
| | | 726/23 |
| 2011/0225402 A1* | 9/2011 | Grisenthwaite ..... G06F 9/30189 |
| | | 712/244 |
| 2013/0205125 A1* | 8/2013 | Grocutt ............... G06F 9/30123 |
| | | 712/244 |

(Continued)

OTHER PUBLICATIONS

R Bedichek, "Some Efficient Architecture Simulation Techniques", Department of Computer Science, FR-35—University of Washington, 1990, 12 pages.

*Primary Examiner* — Keith E Vicary
(74) *Attorney, Agent, or Firm* — Nixon & Vanderhye P.C.

(57) ABSTRACT

Exception control circuitry controls exception handling for processing circuitry. In response to an initial exception occurring when the processing circuitry is in a given exception level, the initial exception to be handled in a target exception level, the exception control circuitry stores exception control information to at least one exception control register associated with the target exception level, indicating at least one property of the initial exception or of processor state at a time the initial exception occurred. When at least one exception intercept configuration parameter stored in a configuration register indicates that exception interception is enabled, after storing the exception control information, and before the processing circuitry starts processing an exception handler for handling the initial exception in the target exception level, the exception control circuitry triggers a further exception to be handled in a predetermined exception level.

16 Claims, 9 Drawing Sheets

(56) References Cited

U.S. PATENT DOCUMENTS

| | | | | |
|---|---|---|---|---|
| 2013/0205403 | A1* | 8/2013 | Grocutt | G06F 21/52 726/27 |
| 2014/0237453 | A1* | 8/2014 | Hulick, Jr. | G06F 8/70 717/127 |
| 2015/0317474 | A1* | 11/2015 | Grocutt | G06F 9/30123 726/27 |
| 2017/0109054 | A1* | 4/2017 | Waechter | G06F 13/4234 |
| 2017/0364379 | A1* | 12/2017 | Warkentin | G06F 11/3636 |
| 2018/0203723 | A1* | 7/2018 | Krueger | G06F 3/0656 |
| 2020/0150970 | A1* | 5/2020 | Evans | G06F 9/3806 |
| 2020/0192585 | A1* | 6/2020 | Parker | G06F 3/0637 |
| 2020/0401441 | A1* | 12/2020 | Evans | G06F 12/1491 |

\* cited by examiner interaction between hypervisor trap and exception
intercept controls for exceptions targeting EL1

|  | exception intercept disabled | exception intercept enabled |
|---|---|---|
| hypervisor trap disabled | target exception level = EL1, handle exception in EL1 | target exception level = EL1, set EL1 exception control registers, then take exception to EL3R |
| hypervisor trap enabled | target exception level = EL2 handle exception in EL2 | target exception level = EL2, set EL2 exception control registers, then take exception to EL3R |

FIG. 10

EXCEPTION INTERCEPTION

BACKGROUND

Technical Field

The present technique relates to the field of data processing. More particularly, it relates to exception handling.

Technical Background

While performing data processing, processing circuitry may encounter an exception which is an event which requires the normal flow of program execution to be interrupted so that processing can switch to an exception handler to deal with the event that caused the exception. For example, an exception may arise for a number of reasons, such as execution of an undefined instruction, an address fault arising due to a memory access to a memory address for which no virtual-to-physical address translation mapping is defined or for which a memory access permission check fails, or the occurrence of some external event such as receipt of a signal from an external device or peripheral.

SUMMARY

At least some examples provide an apparatus comprising:
processing circuitry to perform data processing in one of a plurality of exception levels; and
exception control circuitry to control exception handling for the processing circuitry; in which:
in response to an initial exception occurring when the processing circuitry is in a given exception level, where the initial exception is to be handled by the processing circuitry in a target exception level, the exception control circuitry is configured to:
  store exception control information to at least one exception control register associated with the target exception level, where the exception control information is indicative of at least one property of the initial exception or of processor state of the processing circuitry at a time the initial exception occurred; and
  when at least one exception intercept configuration parameter stored in a configuration register indicates that exception interception is enabled:
    after storing the exception control information to the at least one exception control register in response to the initial exception, and before controlling the processing circuitry to start processing of an exception handler for handling the initial exception in the target exception level, trigger a further exception to be handled by the processing circuitry in a predetermined exception level.

At least some examples provide a method comprising:
performing data processing in a given exception level of a plurality of exception levels supported by processing circuitry; and
in response to an initial exception occurring when the processing circuitry is in a given exception level, where the initial exception is to be handled by the processing circuitry in a target exception level:
  storing exception control information to at least one exception control register associated with the target exception level, where the exception control information is indicative of at least one property of the initial exception or of processor state of the processing circuitry at a time the initial exception occurred; and
  when at least one exception intercept configuration parameter stored in a configuration register indicates that exception interception is enabled:
    after storing the exception control information to the at least one exception control register in response to the initial exception, and before controlling the processing circuitry to start processing of an exception handler for handling the initial exception in the target exception level, triggering a further exception to be handled by the processing circuitry in a predetermined exception level.

At least some examples provide a non-transitory storage medium storing a computer program for controlling a host data processing apparatus to simulate processing of a target program by target processing circuitry capable of performing data processing in one of a plurality of exception levels; the computer program comprising:
processing program logic to control the host data processing apparatus to simulate processing of the target program by the target processing circuitry; and
exception control program logic to control the host data processing apparatus to simulate exception handling for the target processing circuitry; in which:
in response to an initial exception occurring when the target processing circuitry is in a given exception level, where the initial exception is to be handled by the target processing circuitry in a target exception level, the exception control program logic is configured to control the host data processing apparatus to:
  store exception control information to at least one exception control storage location associated with the target exception level, where the exception control information is indicative of at least one property of the initial exception or of processor state of the target processing circuitry at a time the initial exception occurred; and
  when at least one exception intercept configuration parameter stored in a configuration storage location indicates that exception interception is enabled:
    after storing the exception control information to the at least one exception control storage location in response to the initial exception, and before starting simulation of the target processing circuitry processing an exception handler for handling the initial exception in the target exception level, simulate triggering of a further exception to be handled by the target processing circuitry in a predetermined exception level.

Further aspects, features and advantages of the present technique will be apparent from the following description of examples, which is to be read in conjunction with the accompanying drawings.

BRIEF DESCRIPTION OF THE DRAWINGS

FIG. 10 illustrates the interaction between hypervisor trap control and exception intercept control for exceptions targeting a given exception level.

DESCRIPTION OF EXAMPLES

Figure 1:
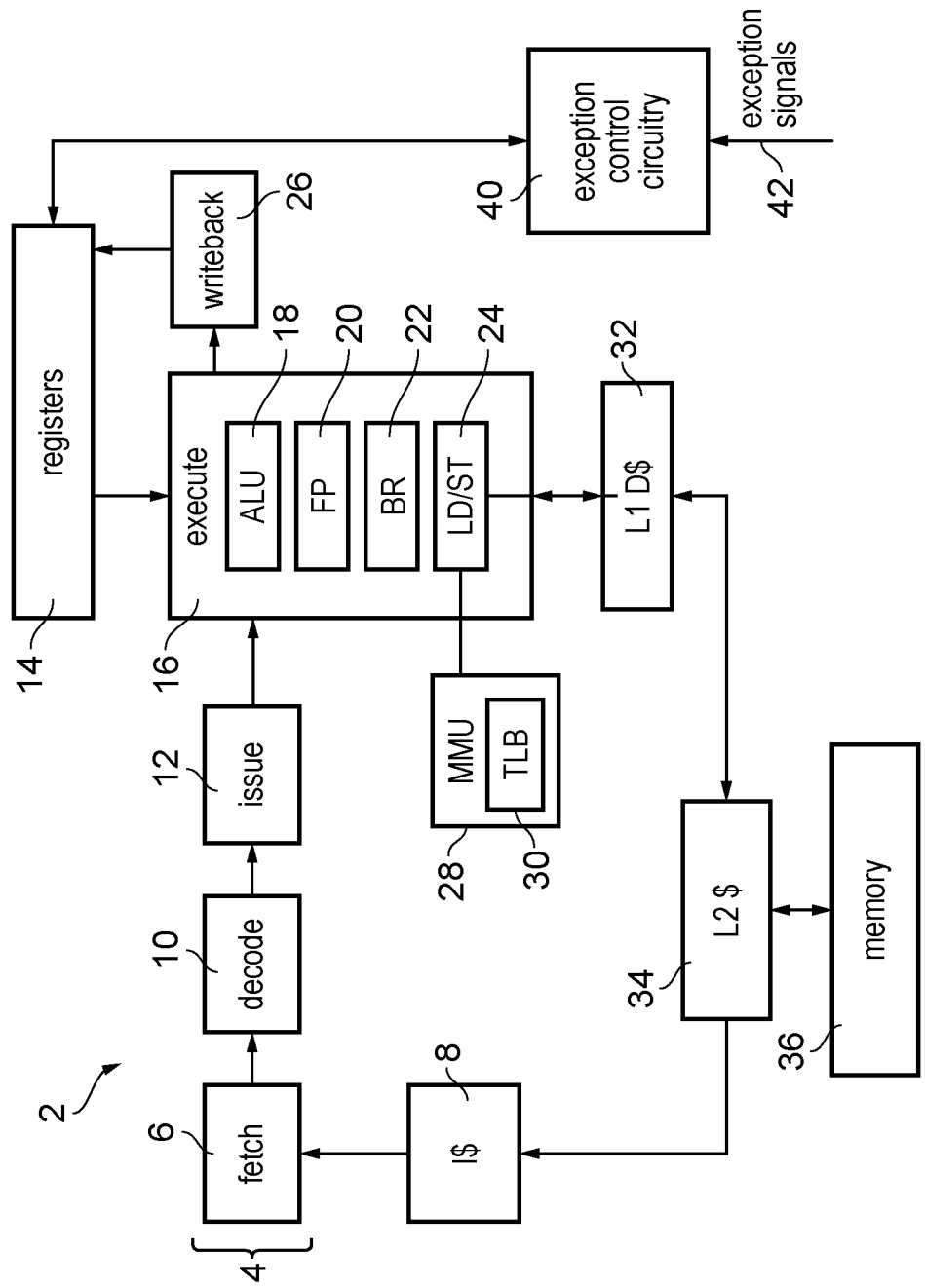
FIG. 1 schematically illustrates an example of a data processing apparatus.

An apparatus has processing circuitry for performing data processing in one of a number of exception levels and exception control circuitry to control exception handling for the processing circuitry. Exceptions occurring during processing by the processing circuitry may be associated with a certain target exception level in which the exception is to be handled. Different exception levels may be associated with different levels of privilege, so that in a given exception level the processing circuitry may be able to access some data or registers which would not be accessible in an exception level associated with a lower level of privilege. For a given exception, the exception level in which a corresponding exception handler is to be executed is referred to as the "target exception level". The target exception level for a given type of exception could be defined in programmable circuitry (e.g. using a control register), or could be fixed so that some types of exceptions may always be handled in a particular exception level.

The apparatus may have at least one exception control register which may be used to capture properties of an exception or of processor state of the processing circuitry at the time an exception occurred, so that the exception handler can identify possible reasons for why the exception may have occurred and take steps to respond to the exception appropriately, or for allowing the processing apparatus to determine, once execution of the exception handler is complete, how to restore processor state and/or return the processing circuitry to the data processing which was being performed before the exception occurred. In some implementations, there may be a number of different exception control registers (or sets of exception control registers) associated with respective exception levels, so that if there are nested exceptions where another exception is taken before handling of an earlier exception is complete, then some of the exception control information stored to the exception control registers can be maintained for each exception to allow the nesting to subsequently be unwound when processing is returned from handling of the nested exceptions.

Hence, when an exception occurs, exception control information may be stored to at least one exception control register associated with the target exception level in which the exception is to be handled. Having set the exception control information in the at least one exception control register, the exception control circuitry may then control the processing circuitry to start processing an exception handler for handling an exception in the target exception level.

However, sometimes it may be desirable to perform some additional processing steps before entering into the exception handler for handling a given exception in the target exception level. For example, for security reasons there may be some operations to be performed which the entity providing the exception handler cannot be trusted to perform itself.

In the techniques discussed below, an exception interception functionality is supported by an instruction set architecture implemented on the processing circuitry. A configuration register is provided which stores at least one exception intercept configuration parameter which can be set to indicate whether exception interception is enabled or disabled. When an initial exception occurs while the processing circuitry is processing in a given exception level, where the initial exception is to be handled by the processing circuitry in a target exception level, then the exception control circuitry checks whether the at least one exception intercept configuration parameter stored in the configuration register indicates that exception interception is enabled. When exception interception is enabled for this exception, then after storing the exception control information to the at least one exception control register associated with the target exception level in response to the initial exception, and before controlling the processing circuitry to start processing of an exception handler for handling the initial exception in the target exception level, the exception control circuitry triggers a further exception to be handled by the processing circuitry in a predetermined exception level. Whether or not the further exception is triggered is dependent on the at least one exception intercept configuration parameter. Hence, this provides an architectural mechanism where the processor can be forced to perform some additional operations (under control of the exception handler associated with the further exception) before entering into the exception handling for an initial exception. This can be useful especially for some security applications, although software developers may find other uses for the exception interception functionality and so the particular operations performed when handling the further exception can vary significantly depending on the needs of a particular piece of software.

The at least one exception intercept configuration parameter may be programmable when the processing circuitry is in a restricted subset of exception levels including the predetermined exception level, and may be read only when in an exception level other than the restricted subset. By restricting which exception levels are allowed to write to the exception intercept configuration parameter, this can help ensure that a malicious party is not able to circumvent any security protection measures which are enforced by generating the further exception, by changing the exception intercept configuration parameter so that such exception interception no longer occurs.

In one example the restricted subset of exception levels could be a subset of exception levels which have a level of privilege greater than a certain threshold. However, in other examples it may be useful for the restricted subset of exception levels to comprise only the predetermined exception level in which the further exception is handled when an exception is intercepted as discussed above.

For example, the predetermined exception level could be the most privileged exception level supported by the processing circuitry, which has the greatest privilege of access to register state and/or data in memory. For example the predetermined exception level could be an exception level in which secure software is executed to manage isolation of respective software processes register states and memory data from other processes. Hence, by triggering a further exception to the most privileged exception level when an initial exception to a target exception level is detected when exception interception is enabled, then this can allow certain secure operations to be performed in that most privileged exception level before then returning processing to the target exception level to commence execution of the exception handler for handling the initial exception.

The at least one exception intercept configuration parameter could be implemented in different ways. In one example, the at least one exception intercept configuration parameter may comprise a global disable parameter, which when set to a predetermined value may indicate that exception interception is disabled for all exception levels. This can allow a single control setting to select whether exception interception is disabled.

In one example the global disable parameter may be the only exception intercept configuration parameter, and hence may also function as a global enable parameter which when set to a value other than the predetermined value indicates that exception interception is enabled for all exception levels.

However, in other examples the at least one exception intercept configuration parameter may have an encoding which specifies, separately for different exception levels, whether the exception interception is enabled or disabled for exceptions for which the target exception level is that particular exception level. This could be provided instead of the global disable parameter, or in addition to the global disable parameter, so that some approaches may have a global disable setting which can override the individual per-exception level settings, but once the global disable parameter is set to a value other than the predetermined value to indicate that exception interception may be enabled, then the exception-level-specific enable parameters may then indicate which particular exception levels have the exception interception enabled.

Hence, in some examples, the at least one exception intercept configuration parameter may comprise at least one exception-level-specific enable parameter indicative of a subset of exception levels for which the exception interception is enabled. As mentioned above, this could be provided as the only exception interception configuration parameters or could be provided in combination with to a global disable parameter, which could override the exception level-specific enable parameters when indicating that exception interception is disabled.

The at least one exception-level-specific enable parameter could be encoded in different ways. In one example the at least one exception-level-specific enable parameter may specify a threshold exception level. With this approach, then exception interception may be enabled for exceptions for which the target exception level is either the threshold exception level or a more privileged exception level than the threshold exception level, other than the predetermined exception level. The exception interception may be disabled for exceptions for which the target exception level is a less privileged exception level than the threshold exception level.

Alternatively, instead of defining a threshold exception level, the at least one exception-level-specific enable parameter could comprise a number of enable indicators each associated with a respective exception level other than the predetermined exception level. Each enable indicator may indicate whether the exception interception is enabled or disabled for exceptions for which the target exception level is the particular exception level associated with that enable indicator.

These are just two examples, and it will be appreciated that the subset of exception levels for which exception interception is enabled could be encoded in any other way by the exception intercept configuration parameter. Regardless of how the encoding is implemented, in general by enabling exception interception to be enabled or disabled for specific exception levels, allowing different settings for different exception levels, this can be useful for controlling the occasions on the further exception is invoked when an initial exception to a particular target exception level occurs.

The processing circuitry may support an exception return instruction which can be used to return from processing of an exception. For example the exception return instruction may control the exception control circuitry to restore previous processor state that was associated with the processing being performed before the exception occurred, and to control switching of the current exception level back to the exception level in which that previous processing was being performed.

In response to an exception return instruction processed by the processing circuitry when a current exception level is an exception level other than the predetermined exception level, the exception control circuitry may check an exception return trap configuration parameter stored in a configuration register, which specifies whether exception return trapping is enabled or disabled. When the exception return trap configuration parameter indicates that exception return trapping is enabled, the exception control circuitry may control the processing circuitry to switch to processing in the predetermined exception level. For example, when the exception return trapping is enabled, execution of the exception return instruction may trigger generation of another exception which may control the processing circuitry to switch to the predetermined exception level. In contrast, if the exception return trap configuration parameter stored in the configuration register specifies that exception return trapping is disabled, then instead of switching to the predetermined exception level, the exception control circuitry may control the processing circuitry to switch to processing in an exception level indicated in at least one exception control register associated with the current exception level. For example, the exception level to which processing returns in response to the exception return instruction may be part of the information which was stored to the at least one exception control register when a previous exception was encountered.

Hence, the exception return trap configuration parameter can control whether an exception return instruction results in a normal exception return operation, unwinding the change of exception level which occurred on a previous exception, or whether instead a switch to the predetermined exception level is triggered. This allows some further operations to be performed after the exception handler for handling an initial exception has been completed, using an additional exception handler in the predetermined exception level, before then returning to the previous processing being performed before the initial exception was encountered. This recognises that typically the exception handler for dealing with the initial exception may have as its last instruction an exception return instruction which would normally be expected to return to the previous processing being performed before the initial exception was handled, but using the exception return trap configuration parameter this can be controlled instead to switch the predetermined exception level. Again, the exception return trap configuration parameter may be programmable only in the predetermined exception level. This ensures that other exception levels are not able to force a trap to the predetermined exception level.

As mentioned above, it will be appreciated that the operations performed before execution of the exception handler for handling the initial exception, and/or after execution of the exception handler is complete, may vary significantly depending on the needs of a particular software program. However, one particularly useful example can be where it is desired to give software processes with lower privilege the ability to exclude more privileged software processes from accessing some data associates with that less privileged software. Memory management schemes may often be implemented based on a privilege hierarchy, where a more privileged process can set memory management information to restrict access to certain regions of addresses by processes at a lower privilege level. Such memory management schemes usually are implemented using a top-down approach where a single controlling process sets the access rights for any processes operating at lower privilege levels than itself, and any data that is accessible to a process at a given privilege level will also be accessible to processes operating at a higher privilege level.

However, for some usage models, such a top-down approach may not be enough as it may also be desirable to prevent higher privilege processes accessing some data associated with lower privilege processes. For example, in a data centre or server environment, a number of virtual machines could be executing under control of a hypervisor. The provider of a given virtual machine which is to execute on a cloud platform server may not trust the server operator managing that server, and so may not wish to expose its data and code to the hypervisor which is provided by the server operator to manage the execution of a number of virtual machines sharing the same physical platform. For this type of usage model and for other similar models, it may therefore be useful to provide features which enable less privileged code to exclude more privileged processes from accessing its data and code.

When a system supports bottom-up control over access to memory in this way, then one issue that arises is that when an exception occurs in a given exception level, the registers of the processor may store register state which is based on data obtained from memory, which could include some information which was accessible to the software process associated with the given exception level, but may not be allowed to be accessed by the process which should handle the exception in a target exception level which may be more privileged than the given exception level. Even if the exception handler in the target exception level would not be allowed to access the underlying data in memory, if the register state associated with the given exception level is maintained within the registers after taking the exception, this could allow the exception handler in the target exception level to circumvent the "bottom-up" protections of the type described above.

One way of providing a counter measure against this may be to require that, on taking an exception from a given exception level to a target exception level in a scenario where the target exception level could be denied access to data accessible to the given exception level, the register state associated with the given exception level is to be saved to memory in a region of the address space which is inaccessible to the target exception level, and for the registers to then be cleared or set to some arbitrary value which is not correlated with their previous contents, so that the exception handler in the target exception level is not able to gain access to the information associated with the given exception level. The exception interception functionality described above can be used to allow such register state saving and clearing operations to be performed before starting execution of the exception handler in the target exception level. The exception handler associated with the further exception may perform such register state saving and clearing operations, before returning processing to the target exception level of the initial exception to continue with execution of the initial exception's exception handler.

Similarly, when the initial exception's exception handler completes and executes an exception return instruction, then if the exception return trap configuration parameter is enabled (this may have been done when the further exception's exception handler previously executed), then instead of returning back to the given exception level, the exception control circuitry may trap the exception return and instead switch processing to the predetermined exception level. Another exception handler in the predetermined exception level may then control operations to restore to the processor registers the register state which was previously saved to memory, so that processing may then return to the previous processing in the given exception level which was being performed before the initial exception was taken. By trapping to the predetermined exception level then this enables the register restoration operations, which cannot be trusted to be performed in the target exception level in response to the initial exception, to be performed securely.

Of course, while this is one example of a usage model which may benefit from the exception interception and return trapping features discussed above, software developers may find other uses for the same architectural functionality. Hence, the particular operations that are performed in software in the predetermined exception level may vary and are not an architecturally required feature. The architectural support, through the exception return trap configuration parameter and the exception intercept configuration parameter for enabling these operations, may be used in different ways by software.

The exception control information which is saved to the at least one exception control register in response to the initial exception may comprise one of a number of pieces of information. For example the exception control information can include any one or more of: a return program counter indicative of a program instruction address to which processing should return following handling of the initial exception; information indicative of the given exception level; information indicative of a current mode of operation of the processing circuitry when the initial exception occurred; and information indicative of a cause of the initial exception.

Of course, these are just some examples and other types of information could also be stored. Hence, even when exception interception is enabled, the exception control information which would normally be stored upon handling the initial exception in the target exception level is still stored to the associated exception control registers. This means that when the exception handler associated with the initial exception eventually executes then it still sees the information that it expects within the at least one exception control register, even though there was an intervening switch to the further exception handler in the predetermined exception level before the initial exception handler started.

When the further exception is taken when exception interception is enabled, then that further exception may cause the exception control circuitry to store further exception control information to at least one further exception control register associated with the predetermined exception level, where the further exception control information is indicative of at least one property of the further exception or of the processor state of the processing circuitry at the time the further exception occurred. Again, this further exception control information could for example indicate a return program counter, the exception level from which the further exception was taken, a current mode of operation of the processing circuitry when the further exception occurred and information indicating a cause of the further exception.

The further exception control information may comprise an indication that the further exception is an exception intercept type of exception which was triggered because exception interception was enabled for the initial exception. Hence, a dedicated intercept type may be defined which may indicate to the exception handler associated with the further exception that this exception was caused by exception interception being enabled, so that the corresponding actions needed to be taken before returning to the initial exception handling can be performed. This distinguishes the further exception from other types of exceptions which may also be handled in the predetermined exception level.

The techniques discussed above may be implemented in a hardware processor which has hardware circuit features providing the processing circuitry and the exception control circuitry as discussed above. The hardware apparatus may have registers provided in hardware to store the exception intercept configuration parameter and exception return trap configuration parameter as discussed above. Also the exception control registers discussed above may be implemented in hardware.

However, in other examples, the technique may be implemented within a program for controlling a host data processing apparatus to simulate processing of a target program by target processing circuitry capable of performing data processing in one of a number of exception levels. The computer program providing the simulation may be stored on a storage medium. The storage medium may be a transitory storage medium or a non-transitory storage medium.

Such simulation computer programs can be useful for allowing target programs developed according to a target instruction set architecture to be executed on a host data processing apparatus which does not itself support the target instruction set architecture. This can be useful for a number of reasons, such as for allowing legacy code to execute on a newer device which does not support the architecture for which the code was developed, or for testing a target program, which is under development for a new instruction set architecture to be released in future, before any hardware devices supporting that new instruction set architecture are yet available. Whereas a hardware-implemented device may have hardware circuits providing the features discussed above, the software simulation may provide corresponding software features, such as program logic and data structures, which emulate the functionality of the corresponding hardware, so that the target program can execute on the simulation in a similar way to how target program would be executed by a corresponding hardware device.

Hence, the computer program may have processing program logic and exception control program logic which functions in an analogous way to the processing circuitry and exception control circuitry discussed above. The exception control program logic may control exception handling based on an exception intercept configuration parameter stored in a configuration storage location, to control exception interception in the way discussed above.

FIG. 1 schematically illustrates an example of a data processing apparatus 2. The apparatus 2 has a processing pipeline 4 which provides processing circuitry for performing data processing in response to instructions. The processing pipeline 4 has a fetch stage 6 for fetching instructions to be executed from an instruction cache 8. A decode stage 10 decodes the fetched instructions to generate control signals for controlling subsequent stages of the processing pipeline 4 to perform the operations represented by the instructions. An issue stage 12 receives the decoded instructions and queues them while waiting for any required operands to be available in registers 14. When the required operands are determined to be available then the instructions are passed to an execute stage 16 which includes a number of execution units 18, 20, 22, 24 for performing processing operations in response to the instructions. The processing operations may use operands read from the registers 14 and generate a processing result which may be written back to the registers 14 by a write back stage 26 of the processing pipeline 4. Other examples may have a different arrangement of pipeline stages (e.g. a register rename stage for mapping architectural registers specified by instructions to physical registers provided in hardware could be included)

In this example, the execute stage 16 includes, as the execution unit, an arithmetic/logic unit (ALU) 18 for performing arithmetic or logical operations on integer operands, a floating-point unit 20 for performing floating-point operations for which at least one of an input operand and an output operand is represented in floating-point representation, a branch unit 22 for evaluating the outcome of branch instructions for triggering non-sequential program flow, and a load/store unit 24 for controlling access to memory. The load/store unit 24 may execute load instructions which control the load/store unit to load data from the memory system to the registers 14, or store instructions which control the load/store unit 24 to store data from the registers 14 to the memory system. It will be appreciated that the particular set of execute units 18 to 24 shown in the example of FIG. 1 is just one possible implementation and other implementations may have different sets of execute units. For example one or more of the types of execute units shown in FIG. 1 could be omitted, or one of these types could be duplicated so that several execute units of the same type may be provided. Also other types of execute unit may be provided dedicated to handling other classes of processing operation not shown in FIG. 1.

For the load/store operations performed by the load/store unit 24, virtual addresses specified by the load/store instructions may be translated into physical addresses by a memory management unit 28, based on address mappings defined in page table data obtained from page table structures within the memory system. A translation lookaside buffer (TLB) 30 may be provided to cache page table entries from the page table structures for faster access by the memory management unit 28.

In this example the memory system includes the level 1 instruction cache 8, a level 1 data cache 32, a shared level 2 cache 34 used for either instructions or data, and main memory 36. However, it will be appreciated that this is just one example of a possible cache hierarchy and other examples could have a greater number of cache levels or could have a different relationship between the instruction caching and the data caching.

Exception control circuitry 40 is provided for controlling exception handling for the processing apparatus 2. Exception signals 42 may be received by the exception control circuitry, to indicate when one of a number of exception conditions has occurred. The exceptions may include a number of types of exception. For example, the decode stage 10 could generate an undefined instruction exception when encountering a fetched instruction which corresponds to an undefined instruction encoding not supported by the apparatus 2. Also, the MMU 28 could generate an address fault exception if a load/store instruction specifies a target address which either does not have an address mapping defined in the page table structures, or which does have an address mapping defined but for which the corresponding address mapping specifies access permissions which are not satisfied by the software process which issued the load/store instruction. Also, exception signals 42 could be received indicating whether an external interrupt has occurred, for example due to receiving a message from an external device or peripheral, such as a message indicating that a user has pressed a button on the device in which the processing apparatus 2 is included, or that a network controller communicating with an outside network has received a message. It will be appreciated that many different types of exceptions may be defined and the examples above are not exhaustive.

When an exception occurs, the exception control circuitry may use register state in the registers 14 to determine whether to take the exception, and if the exception should be taken, what operating state the processing circuitry should be in when taking the exception. If an exception is taken then the exception control circuitry 40 interrupts the processing currently being performed by the pipeline and controls the pipeline to switch to executing an exception handler, which may provide software instructions for responding to the event indicated by the exception type that occurred. For example, if the exception is an address fault then the exception handler may cause the address map to be updated to provide an address mapping for the address, or if the exception was caused by an undefined instruction then the behaviour of that instruction could be emulated through a series of instructions in the exception handler.

Figure 2:
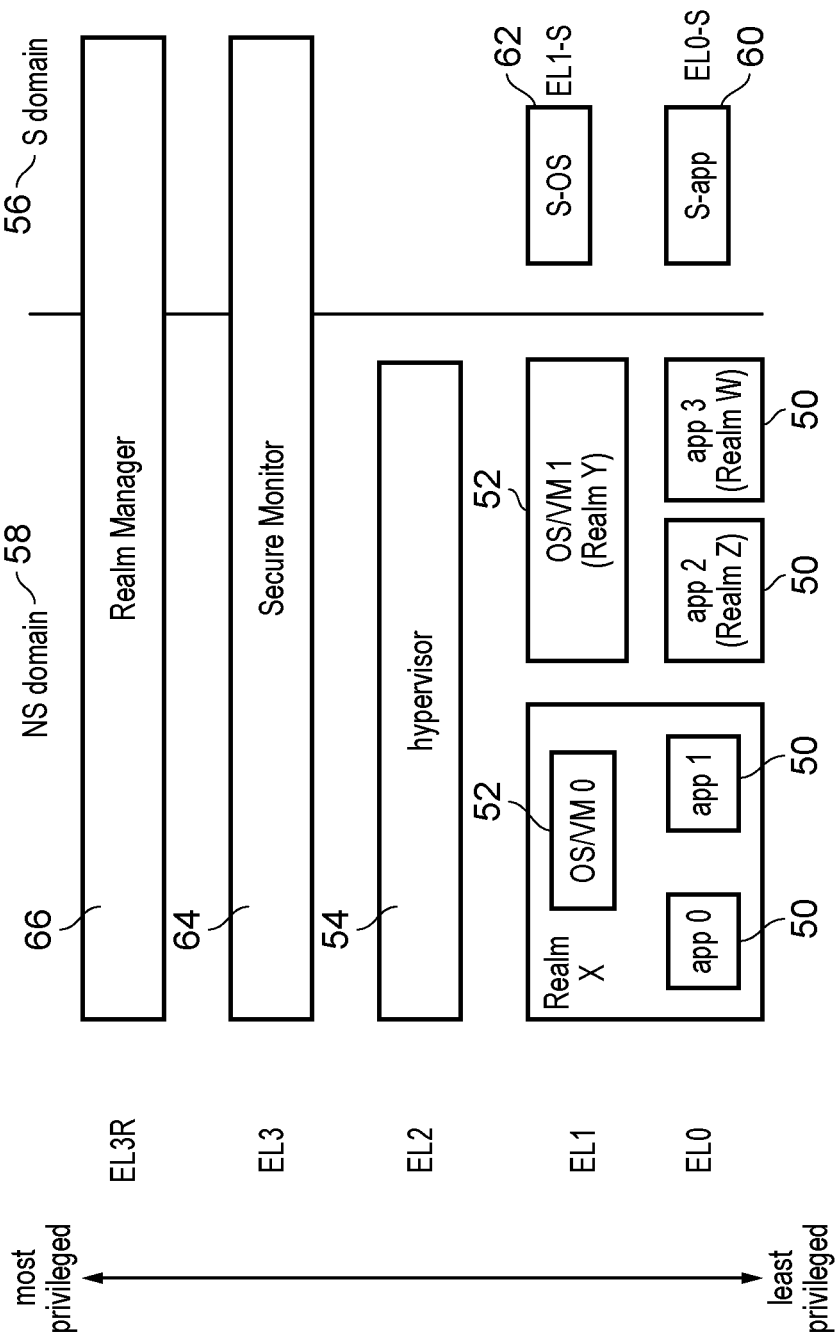
FIG. 2 illustrates a number of exception levels in which processing circuitry can perform data processing.

FIG. 2 is a diagram illustrating different exception levels in which the processing circuitry can operate when executing instructions. In this example there are five exception levels EL0, EL1, EL2, EL3 and EL3R, where exception level EL0 is the least privileged exception level and exception level EL3R is the most privileged exception level. In general, when executing in a more privileged exception level, the processing circuitry may have access to some data or registers 14 which is inaccessible to lower, less privileged, exception levels.

In this example, exception level EL0 is for executing applications 50 which are managed by corresponding operating systems or virtual machines 52 executing in exception level EL1. Where multiple virtual machines 52 coexist on the same physical platform then a hypervisor 54 may be provided operating at EL2, to manage the respective virtual machines 52. Although FIG. 2 shows examples where the hypervisor manages the virtual machines 52 and the virtual machines manage applications 50, it is also possible for a hypervisor 54 to directly manage applications 50 at EL0.

Although not essential, some implementations may implement separate hardware-partitioned secure and non-secure domains of operation for the processing circuitry. The data processing system 2 may have hardware features implemented within the processor and the memory system to ensure that data and code associated with software processes operating in the secure domain 56 are isolated from access by processes operating in the non-secure domain 58. For example, a hardware architecture such as the TrustZone® architecture provided by Arm Limited® of Cambridge, UK may be used. Alternatively other hardware enforced security partitioning architectures could be used. Secure applications 60 may operate in exception level EL0 in the secure domain 56 and secure operating systems or virtual machines 62 may operate in exception level EL1 in the secure domain 56. In some examples, a secure monitor program 64 for managing transitions between the non-secure domain 58 and the secure domain 56 may be provided executing in exception level EL3. Other implementations could police transitions between the security domains 56, 58 in hardware so that the secure monitor program 64 may not be needed.

The MMU 28 may be used to enforce the access rights provided to different software processes operating at the respective exception levels. For example, a supervising process, such as the hypervisor 54 or one of the operating systems 52, 62, may define page table structures in the memory system which indicate, for respective address regions, the access rights used to control access to those regions when executing in a less privileged exception level than the exception level associated with the supervising process. Some systems may support two stage address translations where the hypervisor 54 defines stage two address translation tables and access rights for controlling access by the processes at EL1 and EL0 and the operating system may define stage one page tables defining the access rights for controlling access by the applications 50 at exception level EL0. This approach follows a top-down access control model where a more privileged controlling process sets access rights for the less privileged processes.

However, in some systems, it may be desirable to allow a less privileged process to control whether a more privileged software process is allowed to access its data or code from memory. Therefore, in some examples a Realm manager 66 may be provided operating in exception level EL3R at the highest privilege level, to manage the creation of Realms which correspond to different subsets of software processes or portions of software processes executing on the data processing system. For example, one Realm X could be established which corresponds to the operating system 0 and applications 0 and 1 shown in FIG. 2. With this example, the operating system and the applications running under it are all considered to be part of the same Realm. On the other hand, it is also possible to define an operating system as a separate Realm from the operations under it, such as in the example of Realms W, Y and Z shown in FIG. 2, where Realm Y refers to operating system 1 and Realms Z and W refer to applications 2 and 3 executing under operating system 1.

The Realm manager 66 may control setting up ownership rights over regions in memory which may be assigned to a particular Realm, and which permit the Realm owning a particular region of memory to define access rights so that a more privileged software process than itself is prevented from accessing the data or program code stored in that owned memory region. The enforcement of such access rights can be controlled by the MMU 28 or by another similar hardware structure which provides ownership tables defining the Realm access permissions defined for different address regions. The Realm manager 66 may be responsible for ensuring that such tables are set up securely and for managing transitions between different Realms. FIG. 2 shows an example where the hypervisor 54, secure monitor 64 and all the processes operating in the secure domain 56 are not within a defined Realm. It is not essential for Realms to be defined for all parts of the address space or for all software processes, and any addresses for which no specific Realm has been established could either considered to be part of no Realm or could be considered to be part of a default Realm.

This Realm-based access control can be particularly useful for data centres or data processing platforms where the same physical platform may support a number of different virtual machines 52 provided by different entities which are executing in coexistence on the same physical platform. While traditional top-down page table controls may enable the data and code provided for one virtual machine and its applications to be inaccessible to another virtual machine and related applications running on the same system, the top-down approach would normally allow any data or code associated with a virtual machine 52 to be visible to the hypervisor 54 executing at a more privileged level, as such top-down controls traditionally only enforce access rights on lower privilege levels and it is assumed that data accessible to a given exception level is accessible to all higher exception levels as well. By providing the Realm-based approach, which is complementary to such page table-based controls, this allows further control so that the party providing a virtual machine or application on the cloud system or server is able to prevent its code or data being visible to a hypervisor 54 which may be provided by a different entity such as the cloud platform operator, if the entity providing the virtual machine does not trust the cloud platform operator. This can enable greater security.

Figure 3:
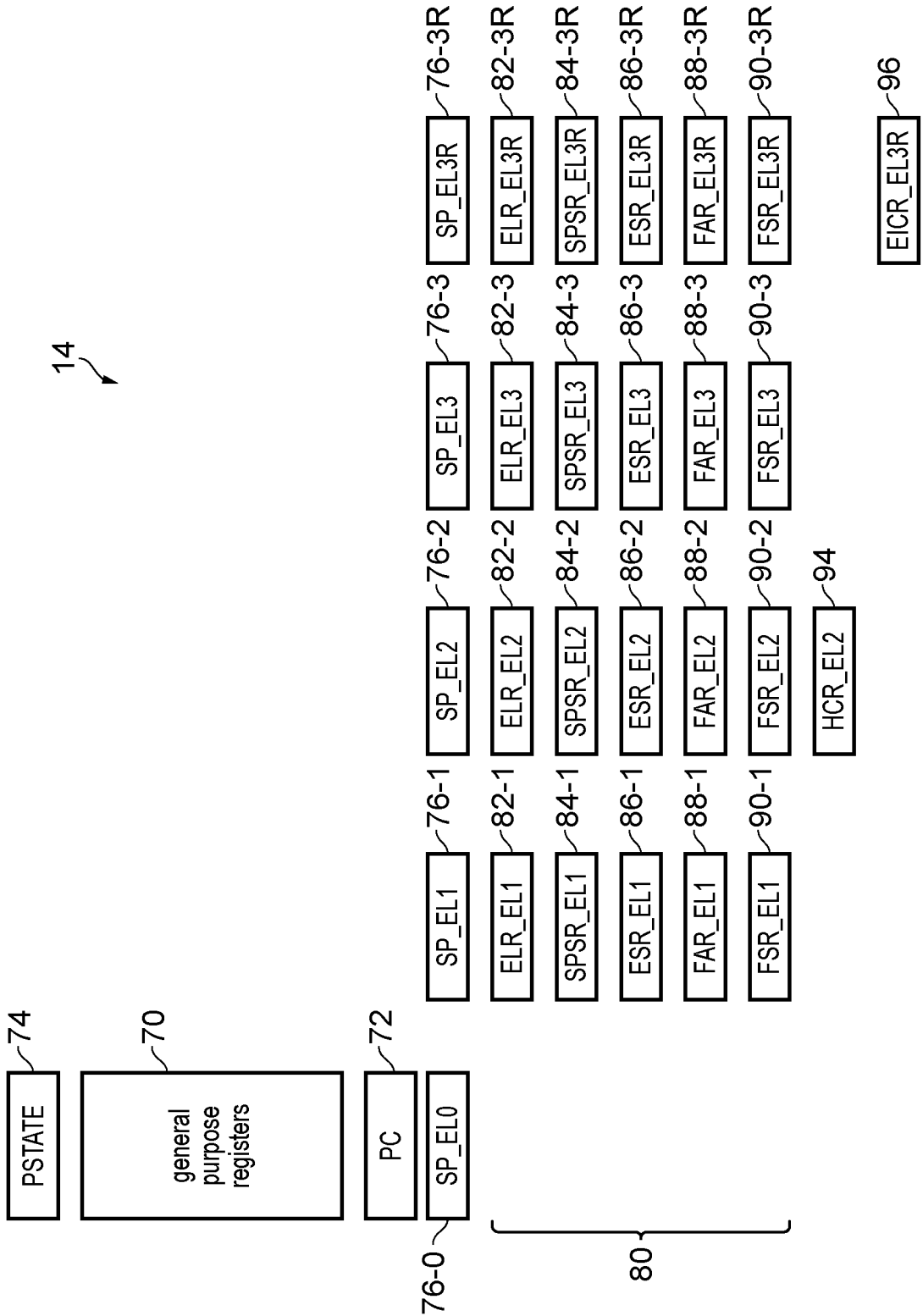
FIG. 3 shows an example of a subset of registers of the processing apparatus.

FIG. 3 shows an example of some of the registers 14 provided in the data processing apparatus 2. It will be appreciated that FIG. 3 does not show all of the registers which may be provided, but focuses on a subset relevant for exception handling as discussed in the later examples. Hence, additional registers could also be provided. Also, other implementations may not provide exactly the same combination of registers—some registers could be omitted.

The registers 14 include a number of general purpose registers 70 which may be used as source registers for storing operands for instructions executed by the execute stage 16 and as destination registers for writing back results of executed instructions. The general purpose registers 70 may be used for integer processing instructions or for branch instructions or load/store instructions. In systems having a floating-point processing unit 20 some floating-point registers dedicated to storing floating-point operands could also be provided, or alternatively, these could be stored in the same registers as the integer operands. Similarly, other types of registers could also be provided for storing instruction operands and results, such as vector registers for storing vector values having multiple data elements.

The system may also have a number of control registers storing configuration parameters and status information which can be used to control the processing being performed on the processing pipeline 4. For example the registers 14 may include a program counter register 72 which stores a program counter (PC) indicating the instruction address of an instruction representing a current point of execution. Also, a processing state (PSTATE) register 74 may be provided to store information representing the current execution state of the processor 2. For example, the PSTATE register 74 may include an indication of the current exception level in which the processor is executing instructions. Other information that could be stored in the PSTATE register 74 may include an indication of a current instruction set being executed (in a system supporting multiple instruction sets), and/or an indication of an operating mode in which the processor is executing (for example some systems could support different operating modes associated with different operand bit widths, e.g. a 32-bit mode and a 64-bit mode). Also the PSTATE register 74 could include condition flags which may be set based on the result of a processing operation. The condition flags may be tested by a conditional instruction to determine whether to perform a conditional operation depending on whether the condition flags meet a test condition specified by the conditional instruction. For example, the condition flags could indicate whether a result of a previous operation was negative (N), equal to zero (Z), generated a carry (C), or generated an overflow (V). These are just some examples of possible information that could be stored in the PSTATE register 74 to indicate information about the current operating state of the processor. It will be appreciated that it is not essential for all of this information to be stored in one register, and other examples could split it across multiple different registers.

Also, the registers 14 may include a stack pointer register 76 which may be used to store a stack pointer for indicating an address of a stack data structure in the memory system. Often it may be desirable for processes at different exception levels to use different stacks, and so to avoid constantly needing to change the contents of the stack pointer register 76 each time a switch between exception levels is made, the stack pointer register 76 may be banked so that different versions of the stack pointer register 76 are provided in hardware for respective exception levels EL0 to EL3R. For the banked registers, instructions referencing the stack pointer register do not distinguish between the different banked versions of the register 76 provided in hardware, but when an instruction referencing the stack pointer register is executed, the processing hardware may select the appropriate one of the banked versions of the stack pointer register 76 based on the current execution state. System instructions may also be allowed to access versions of the stack pointer register associated with less privileged exception levels than the current exception level. In the example of FIG. 3, the notation SP_ELx indicates that the register SP_ELx is accessible to exception level ELx and any more privileged exception level. That is, the exception level ELx indicated in the suffix for a banked register indicates the least privileged exception level that is allowed to access that register.

The registers 14 also include a number of exception handling control registers 80 which may be used for exception handling by the exception control circuitry 40. The exception control registers 80 include an exception link register (ELR) 82, a saved processor state register (SPSR) 84, an exception syndrome register (ESR) 86, a fault address register (FAR) 88 and a fault status register (FSR) 90. Each of the registers 82, 84, 86, 88, 90 has banked versions of the register provided in hardware, associated with exception levels EL1, EL2, EL3 and EL3R respectively.

The exception link register 82 is used to store an exception return address which indicates an instruction address of an instruction to be executed next after returning from handling of an exception. When an exception is taken which targets a particular exception level ELx, then before executing the corresponding exception handler in exception level ELx, the exception control circuitry 40 saves the address of the current point of execution from the program counter register 72 to the exception link register 82-x associated with the exception level ELx in which the exception is to be handled. An exception return instruction executed at the end of the exception handler may reference the exception link register to identify the next instruction to branch to after the exception has been handled.

The saved processor state register 84 is used to capture the contents of the processor state register 74 when an exception is taken, so that the exception control circuitry 40 can restore the saved processor states when exception handling is complete. Hence, on taking an exception to be handled at the exception level ELx, the banked version of the SPSR 84-x associated with that exception level is updated based on the contents of the PSTATE register 74, and then processing can switch to the exception level ELx in which the exception is to be handled. If changes are made to the PSTATE register 74 then this does not affect the captured state in the corresponding SPSR 84-*x*, which can then be restored later once the exception handling is complete.

The exception syndrome register 86, fault address register 88 and fault status register 90 are used to provide information on the cause of the exception, which can be useful for the exception handler to determine how to respond. For example, the exception syndrome register 86 can record an exception type indicator which identifies the type of exception that occurred. If the exception was caused by an address fault detected by the MMU 28, then the address of the memory access which triggered the address fault can be recorded in the fault address register 88, which can help an exception handler determine how to update page table structures to prevent the fault happening again for example. The fault status register 90 can be used to record additional information on the location or instruction at which the fault occurred, which can be useful for debugging purposes.

Hence, collectively the registers 82 to 90 may be referred to as exception control registers and may be populated with information when an exception is taken. It will be appreciated that other types of exception control registers could be provided and that it is not necessary to provide all of the types of exception control registers shown in FIG. 3.

The registers 40 also include a hypervisor control register 94 which is accessible in exception level EL2 (or a more privileged exception level than EL2), and which provides information defining properties of the virtualisation provided by the hypervisor 54. For example the HCR 94 may define whether a hypervisor is provided at all (e.g. whether virtualisation is enabled or disabled). Also the hypervisor control register 94 may specify whether certain types of exceptions which would normally be taken at exception level EL1 by the operating system, should instead trap to the hypervisor 54, for example so that the hypervisor can emulate certain functionality which is not actually supported in hardware but may be provided in a virtual manner by equivalent software handlers provided by the hypervisor 54. Also trapping certain types of exceptions to the hypervisor 54 can allow the hypervisor 54 to mask the fact that an operating system or virtual machine at a lower exception level is coexisting on the same physical platform as another operating system or virtual machine. Hence, while in general a given type of exception may be associated with a certain target exception level indicating the exception level in which it is to be taken, a control setting in the hypervisor controller register 94 may override those settings and may specify certain types of exception that should be taken at EL2 instead of EL1. A number of independent control settings may be provided for different types of exceptions, so that some types of exceptions targeting EL1 may still be taken at EL1 and other types of exceptions targeting EL1 may instead trap to EL2, depending on the settings in the hypervisor control register. The HCR 94 may be writable by the hypervisor 54 at EL2 or higher privilege levels, but may be read by the exception control circuitry 40 at lower exception levels, although it may not be directly accessible in response to instructions of program code executed at EL1 or EL0.

Also, the registers 14 may include an exception interception control register (EICR) 96 which is used to control exception interception functionality described further below. The EICR 96 is accessible only to the most privileged exception level EL3R, and is programmable only by instructions executed at the most privileged level EL3R. At lower privilege levels the EICR 96 is readable by the hardware of the exception control circuitry 40 to determine how to handle exceptions, but is not accessible in response to instructions executed on the processing pipeline 4 so that EICR 96 is not visible to software other than the Realm manager 66 operating at EL3R.

Figure 4:
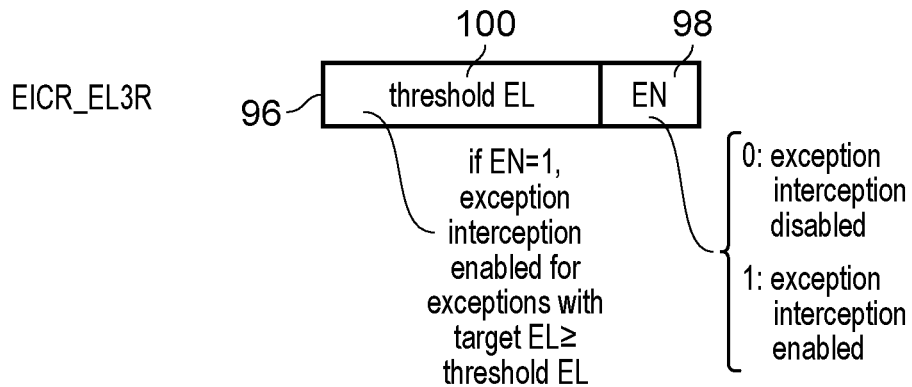
FIGS. 4 and 5 show two examples of at least one exception intercept configuration parameter.
Figure 5:
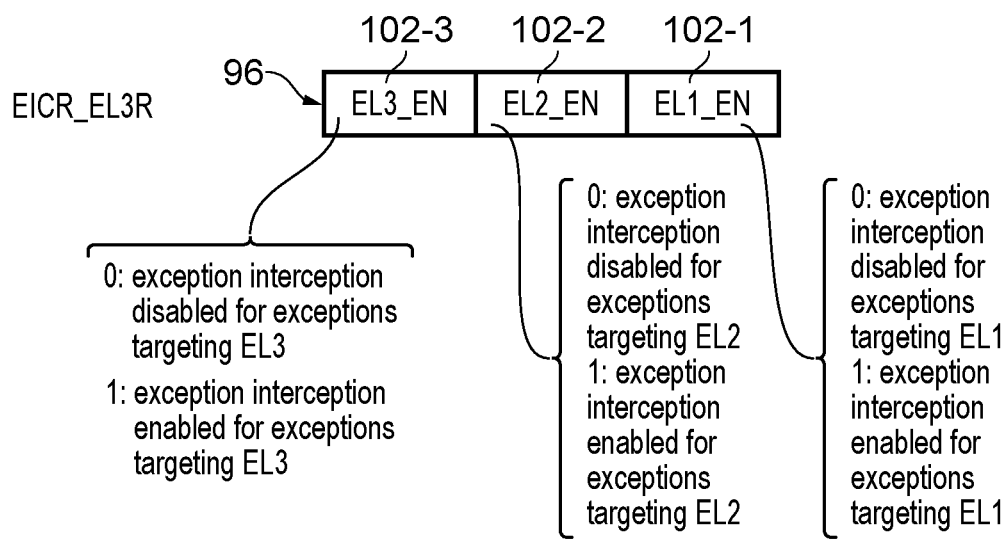

The EICR 96 stores an exception interception configuration parameter which controls whether exception interception is enabled or disabled for respective exception levels of the processing apparatus 2. FIGS. 4 and 5 show two examples of encoding of the exception interception configuration parameters of the EICR 96.

FIG. 4 shows a first example in which the exception interception configuration parameters include a global enable/disable parameter 98 and a threshold exception level 100. When the global enable/disable parameter 98 is set to a first value (e.g. zero) then the exception interception is disabled for all exception levels. When the global enable/disable value 98 is set to a second value (e.g. 1) then exception interception is enabled for exceptions to be taken at a target exception level which is greater than or equal in privilege to the threshold exception level 100 indicated in the EICR 96. For example if a threshold exception level 100 indicates exception level EL1, then if the enabled/disabled parameter 98 is equal to 1 then this means that exceptions to be taken in exception levels EL1, EL2 and EL3 may all have exception interception enabled. When exception interception is enabled, then the exception is taken as normal and the exception control registers 80 for the target exception level are populated with the relevant exception control information as described above, such as the return address being stored to the exception link register 82 and the processor state being stored to the SPSR as discussed above (with that information being stored to the relevant banked version of these registers associated with the target exception level). Also the exception status registers 86, 88, 90 can be set to indicate properties of the exception that occurred.

However, when exception interception is enabled, then before starting execution of the exception handler associated with the target exception level, which would normally be executed to perform the relevant exception handling processing needed to deal with the exception, the exception control circuitry 40 triggers a further exception which targets exception level EL3R, which may then lead to further exception-related information being stored to the set of exception control registers 82-3R, 84-3R, 86-3R, 88-3R, 90-3R associated with exception level EL3R, and then an exception handler executing in exception level EL3R can perform some additional actions as a preliminary operation, prior to the start of the exception handler associated with the initial exception to be handled at the target exception level for which exception interception was enabled. Conversely, when exception interception is disabled for a given exception level then exceptions targeting that exception level still populate the exception control registers 80 for the relevant target exception level as normal, but in this case execution of the corresponding exception handler starts without triggering a further exception to exception level EL3R.

This approach can be useful to support the Realm-based access control model discussed above with respect to FIG. 2. The Realm-based controls may police access to the memory system 8, 32, 34, 36 so that a region of the address space allocated to a particular Realm is inaccessible to more privileged processes than the Realm if desired by the code running in that Realm. However, when an exception occurs then this may cause processing to switch from code running in the Realm to the code at a higher privilege level which may be outside the Realm, and at this point there may still be data stored in the registers 14 which may be associated with the Realm and it may be desirable to prevent the more privileged code from being able to see this data.

Therefore, when processing software in a given Realm, if an exception occurs which requires handling by an exception handler running at a more privileged exception level which is outside of the Realm, it may be desirable to save the contents of registers 70 to a region of memory which is owned by the Realm and so is inaccesible to the more privileged code, and to clear the contents of those registers so that the more privileged code associated with handling the exception cannot access the potentially sensitive information which the Realm wished to protect. By defining the exception interception configuration parameters so that exceptions which are to be handled outside of the current Realm have the exception interception enabled, this means that those exceptions can trigger a further exception to be handled by the Realm manager 66 in exception level EL3R before the code associated with the exception handler for the initial exception starts executing, so that the Realm manager 66 can then control the state saving and clearing operations performed to protect the Realm's data against inappropriate access by higher privileged code. For example, for Realm X shown in FIG. 2, the threshold exception level 100 could be set to the EL2 so that exceptions taken at EL1 do not need to have exception interception enabled because the operating system at EL1 is considered part of the same Realm as the applications 50 under it, but for Realms Z and W shown in FIG. 2 where the Realm boundary is between exception levels EL0 and EL1, a threshold exception level 100 of EL1 could be defined so that in this case exception interception is enabled for exceptions occurring at exception level EL0 which are handled at EL1.

The settings provided in the EICR 96 may be part of the context associated with an incoming software process which is written to the EICR 96 (along with other control state information written to other control registers) when a context switch is made to a given process.

FIG. 5 shows an alternative encoding for the EICR 96 in which instead of providing the global enable 98 and threshold exception level 100, the EICR 96 instead specifies individual enable indicators 102-1, 102-2, 102-3 for the respective exception levels EL1, EL2, EL3, which separately indicate whether exception interception is disabled or enabled for exceptions targeting the corresponding exception level.

It will be appreciated that these are just some examples of how the exception interception configuration parameters could be represented. In general, any configuration information which defines whether to perform exception interception for an exception targeting a particular exception level can be used.

Figure 6:
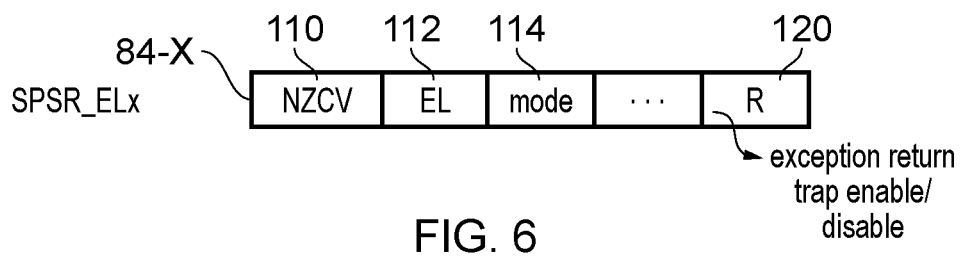
FIG. 6 shows an example of an exception return trap configuration parameter.

FIG. 6 shows an example of one of the banked versions of the SPSR 84-x which is associated with a given exception level ELx. The SPSR 84 may include fields for defining the condition flags 110, exception level 112 and operating mode 114, similar to the PSTATE register 74 discussed above. Hence, on taking an exception to be handled at exception level ELx, the current values of the condition flags, current exception level indicator and current operating mode indicator may be copied from the PSTATE register 74 to the corresponding fields 110, 112, 114 of the SPSR 84 associated with the exception level ELx in which the exception is to be taken.

As indicated in FIG. 6, the SPSR may also have an exception return trap enable/disable parameter (R). This can be used to control whether to trap to the exception level EL3R when an exception return instruction is executed by code in the corresponding exception level ELx. Again, this can be useful to allow the Realm manager to perform some extra operations after completion of the exception handler executing an exception level ELx, before processing then returns to the previous exception level from which the exception to be handled at exception level ELx was taken. For example, trapping exception return instructions to exception level EL3R may allow the Realm manager 66 to restore the state previously saved to the Realm's owned memory region to the general purpose registers 70 or other registers, to allow the previous processing associated with the Realm to then resume as if the Realm processing was never interrupted. The exception return trap enable/disable indicator 120 may be writable only in exception level EL3R. Hence, if an attempt to set the exception return trap enable/disable parameter from another exception level, this may be rejected.

Figure 7:
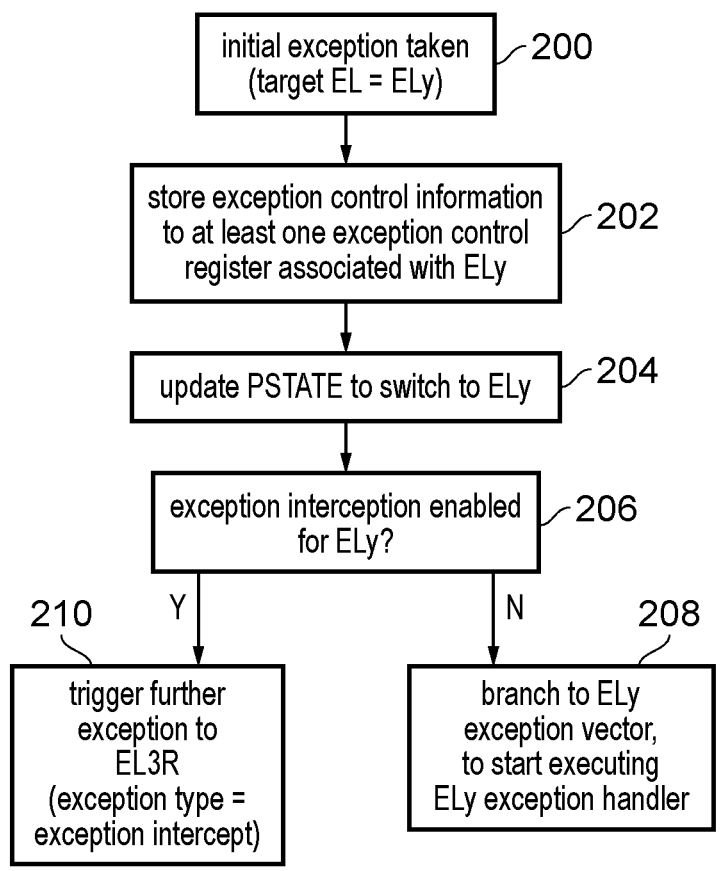
FIG. 7 is a flow diagram showing a method of controlling exception handling in response to an exception to be handled in a target exception level.

FIG. 7 is a flow diagram showing operations performed by the exception control circuitry 40 when an exception is to be taken. An exception is taken if an exception signal 42 is detected for a type of exception which is not masked and which has a higher priority than any currently pending exception. Each exception may be associated with a given target exception level in which the exception is to be taken. In FIG. 7 the target exception level is referred to as ELy. The target exception level for a given exception could be either a fixed exception level which implicit from the exception type, or could be programmable so that a given exception can be handled at different exception levels. Also, while a given exception may normally be associated with a particular target exception level, the hypervisor control register 94 can be used to override that normal target exception level and specify that instead the target exception level should be EL2 so that the hypervisor 54 may handle the exception.

Hence, at step 200 in FIG. 7, an exception is taken. This exception is an initial exception occurring during processing of some previous code. That previous code could be an application running at exception level EL0 or a piece of software executing at higher exception levels. The previous code could also be an exception handler being executed following occurrence of an earlier exception. Hence, while the exception taken at step 200 is referred to as the "initial exception" for ease of understanding, it is not intended to imply that it must be the very first exception in a chain of exceptions. Instead, the term "initial exception" simply refers to the exception taken at a given point, and is used to contrast with the further exception triggered at step 210 described below.

When the initial exception is taken, then at step 202 the exception control circuitry 40 stores exception control information to at least one of the exception control registers 80 associated with the target exception level ELy. For example, the exception control circuitry 40 may copy the address in the program counter register 72 to the exception link register ELR_ELy 82-y associated with the target exception level, and may copy the contents of the PSTATE register 74 to the saved processing state register SPSR_ELy 84-y associated with the target exception level. Also information on the cause of the exception can be stored to the respective registers 86-y, 88-y and 90-y, such as indicating the type of exception that occurred and for certain types of exception further information on the cause, such as the address which triggered an address fault.

Having saved the exception control information (to indicate various properties of either the exception that occurred or the processing that was being performed before the exception was encountered to the exception controller registers 80), at step 204 the exception control circuitry updates the PSTATE register 74 to control the processing circuitry to switch to the target exception level ELy, ready for handling the exception.

At step 206 the exception control circuitry 40 checks the exception interception configuration register 96 to determine whether exception interception is enabled for exceptions to be taken in the target exception level ELy. If exception interception is disabled for the target exception level ELy then at step 208 the exception is handled in exception level ELy as normal. Hence, the exception control circuitry 40 triggers a branch to an exception vector address, which indicates the address of the exception handler to be executed or indicates indirectly the exception handler address by specifying an address of a table which can then be used to identify the actual exception handler address. Once the address of the instruction marking the start of the exception handler has been identified using the exception vector, then the exception handler can start executing to perform the relevant processing operations for dealing with the event indicated by the initial exception.

On the other hand, if exception interception is enabled for exception level ELy, then at step 210, before starting execution of the exception handler for handling the initial exception, the exception control circuitry 40 generates a further exception which specifies as its target exception level exception level EL3R. The handling of that further exception may itself be performed using the method shown in FIG. 7, so may lead to further exception control information being stored to the exception control registers associated with exception EL3R at step 202. By triggering the further exception before the initial exception's exception handler is started, this means some preliminary operations can be performed by the realm manager 66 operating at EL3R, such as the state saving and clearing operations described above.

The further exception triggered at step 210 may be associated with an exception type identifier which has a predetermined value used to identify that this exception is caused by an exception intercept, to distinguish it from other types of exceptions. This dedicated exception intercept exception type can be used to select a different exception handler to other exceptions to be taken at exception EL3R, where that dedicated exception intercept exception handler may for example perform the state saving and clearing operations.

Figure 8:
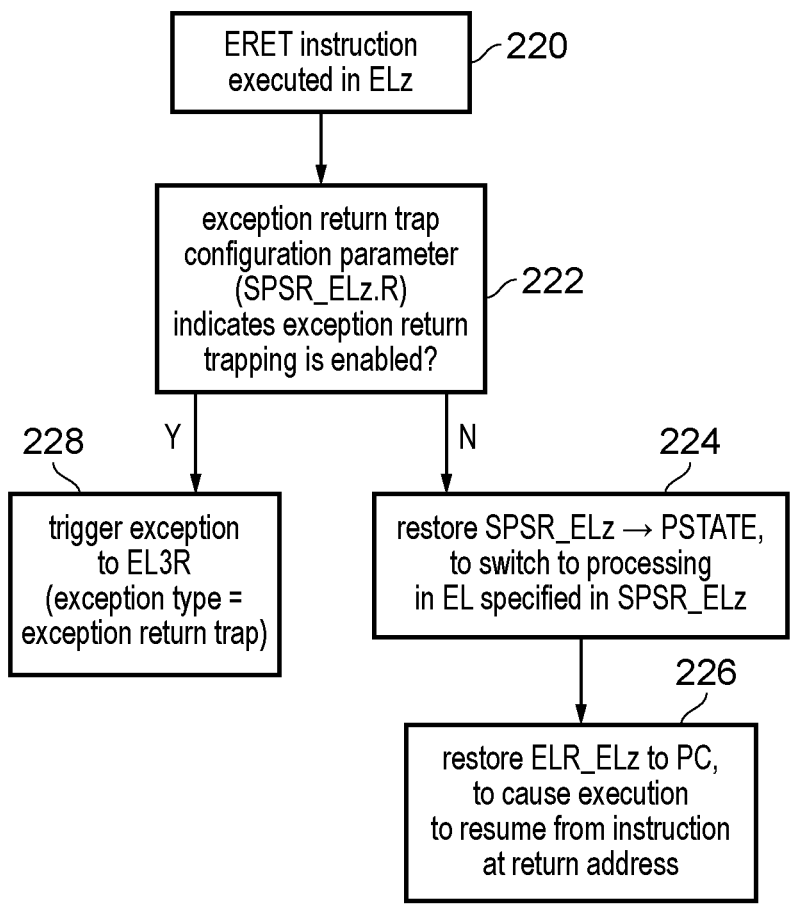
FIG. 8 is a flow diagram showing a method of processing an exception return instruction.

FIG. 8 is a flow diagram showing a method of handling exception return. At step 220 an exception return (ERET) instruction is executed while the processor is processing instructions at a given exception level ELz, where ELz could be any of exception levels EL1, EL2, EL3 or EL3R. The exception return instruction may be expected to be the last instruction executed within an exception handler, so that processing may return to the processing that was being carried out before the corresponding exception occurred. Hence the exception return instruction is an instruction which signals that the processor should switch back to the less privileged exception level associated with the background processing or earlier exception handler which was being processed before the exception taken at exception level ELz was started.

When an exception return instruction is executed, then at step 222 the exception control circuitry 40 checks the exception return trap configuration parameter 120 stored in the banked version of the SPSR 84-z associated with the current exception level ELz. The exception control circuitry 40 determines whether the exception return trap configuration parameter (e.g. an enable/disable indicator as in the example 120 of FIG. 6) indicates whether exception return trapping is currently enabled for that particular exception level ELz. If exception return trapping is disabled, then at step 224 the exception control circuitry 40 restores the values to the processor state register 74 which were previously saved to the saved processor state register SPSR_ELz when the corresponding exception was taken, which has the effect of switching the processing circuitry to processing in a particular exception level as specified in the SPSR 84-z. This exception level will be the exception level associated with the code that was being executed before the corresponding exception code. At step 226 the exception control circuitry 40 also restores the program counter 72 based on the exception return address stored in the relevant banked version of the exception link register 84-z associated with the current exception level ELz. Setting the program counter to the exception return address causes the processing pipeline 4 to resume execution from an instruction associated with that return address.

If at step 222 it was determined that exception return trapping is enabled for the current exception level ELz then at step 228 instead of restoring the processor state 74 and program counter 72, the exception control circuitry 40 generates an additional exception to be handled at exception level EL3R. Hence, generation of the additional exception depends on the exception return trap enable/disable parameter 120. This additional exception may be associated with an exception type which indicates that it was caused by trapping of an exception return instruction. The handling of the additional exception (which again may be performed as shown in FIG. 7) causes an exception handler to be executed which performs any additional operation needed at the end of an exception taken in exception level ELz, such as the restoration of state to registers 70 which was previously saved to a realm's owned region to prevent it from being accessed to a higher privilege code.

The exception return trap configuration parameter 120 may be settable by code executing in the most privileged exception level EL3R. For example when handling the further exception generated at step 210, the corresponding exception handler may set the exception return trap configuration parameter 120 in the relevant SPSR for exception level ELz to indicate that exception return trapping is enabled, and then when handling the exception triggered at step 228 of FIG. 8 the corresponding exception handler at EL3R may disable the exception return trapping again, so that if later another type of exception, (not related to exiting a realm) occurs to be handled at the exception level ELz then the return from handling that exception at ELz need not trap to the most privileged exception level EL3R.

Figure 9:
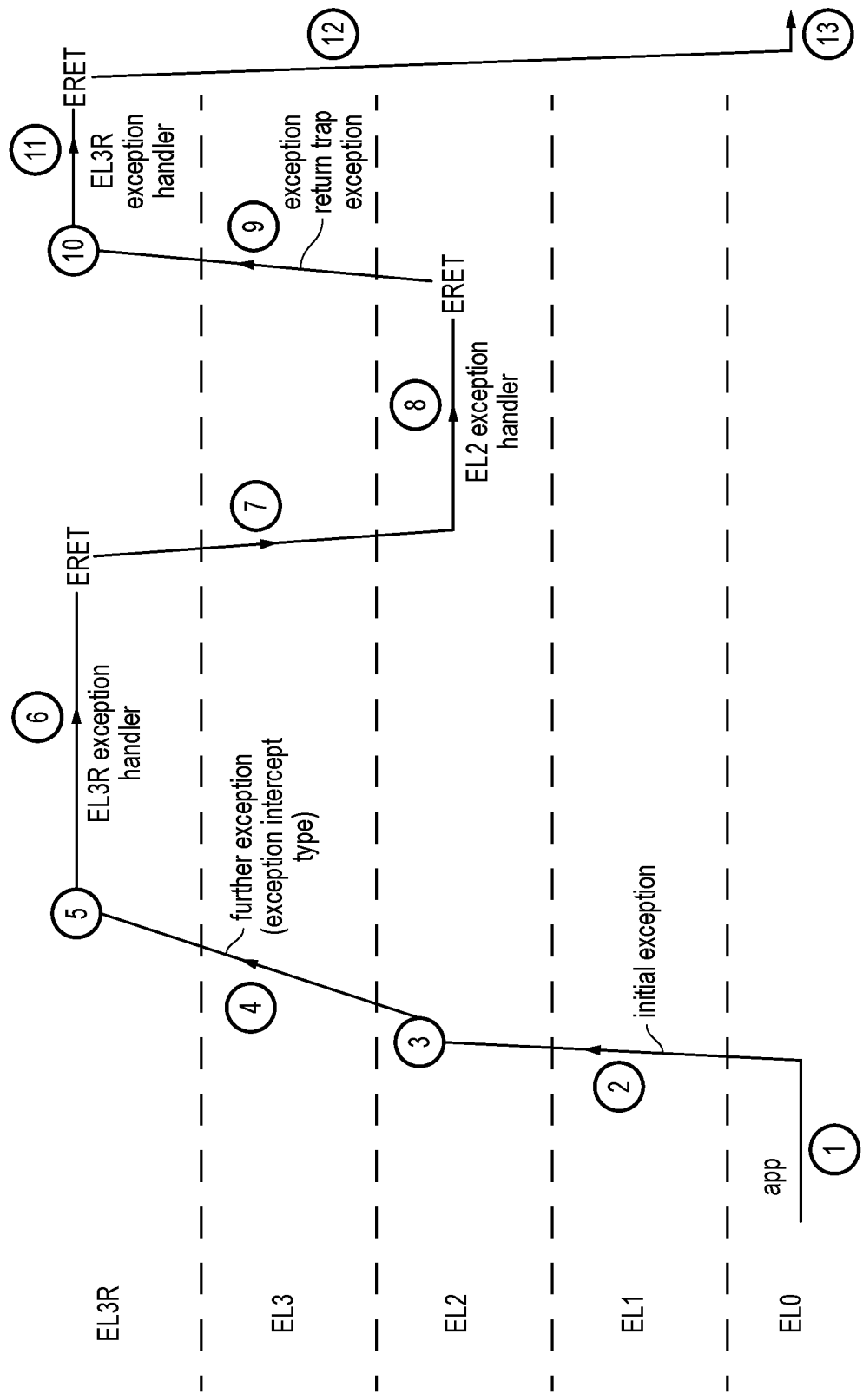
FIG. 9 schematically illustrates an example of using the exception intercept functionality.

FIG. 9 shows an example of a sequence of operations involving the exception interception functionality described above. In this example it is assumed that exception interception is enabled for exceptions to be taken at exception level EL2.

Initially, at step 1 of FIG. 9, an application 50 is being executed in exception level EL0. At step 2, an exception occurs which has a target exception level EL2. In response, at step 3, the exception control circuitry 40 saves the exception control information to the exception control registers 80 associated with EL2, such as setting the exception return address in ELR-EL2 82-2, saving the processor states to the SPSR-EL2 84-2 and setting information in the diagnostic registers 86-2, 88-2, 90-2 for identifying a cause of the exception. Before starting to execute the EL2 exception handler which would normally be executed for handling the exception, a further exception is triggered at step 4 because the exception control circuitry 40 detects from the EICR 96 that exception interception is enabled for exceptions handled at EL2. At step 5, the further exception causes the exception control circuitry 40 to save further exception control information to the exception control registers 82-3R to 90-3R associated with exception level EL3R, including saving as the exception type an exception type identifier indicating that this further exception is of the exception intercept type. The processor state is switched to indicate that the current exception level is now exception level EL3R and at step 6 execution of the exception handler for handling the further exception proceeds in exception level EL3R.

The EL3R exception handler may, for example, save the contents of at least a subset of the registers 14 to memory regions associated with the realm which was being executed before the initial exception occurred, and may clear the contents of these saved registers to prevent access by the EL2 exception handler to be executed at exception level EL2. Also the EL3R exception handler 6 may set the exception return trap indicator 120 in SPSR_EL2 84-2 to indicate that exception return trap is enabled. Also, the saved PSTATE and program counter information from the SPSR-EL2 and ELR-EL2 may be saved to the Realm's owned regions, to allow the EL3R code to determine how to return to EL0 after trapping EL2's exception return to EL0 (see step 12 below). It will be appreciated that other operations could also be performed by the EL3R exception handler at step 6.

The final instruction of the EL3R exception handler is an exception return instruction and when this is encountered then at step 7 this controls the exception control circuitry 40 to restore the contents of the processing state register 74 and program counter register 72 based on the values which were saved to the SPSR_EL2 and ELR_EL2 registers respectively when the further exception was taken at step 4. This causes processing to switch back to exception level EL2 and to branch to the instruction at the start of the EL2 exception handler, which is then executed at step 8. Hence at this point, the regular exception handling processing which would normally be performed in response to the initial exception is carried out.

At the end of the EL2 exception handler another exception return instruction is encountered which the provider of the EL2 exception handler would have expected to return processing back to the application running at EL0 from which the exception was taken. However, as the exception return trap configuration parameter 120 has been set to enable exception return trapping, then instead the exception control circuitry 40 generates an exception return trap exception at step 9 shown in FIG. 9, which again leads to exception control information being stored to the exception control registers associated with EL3R at step 10, and causes another EL3R exception handler to be executed at step 11. The exception return trap exception triggered at step 9 may be specified to have an exception type indicating that it was caused by exception return trapping which may lead to a different exception handler being selected at step 11 compared to at step 6. This exception handler may perform various actions for returning processing back to the original application, including restoring registers 4 with the register contents previously saved to memory at step 6. Also, the exception handler at step 11 may clear the exception return trap indicator in SPSR_EL2 to disable exception return trapping for exception level EL2.

Also the EL3R exception handler at step 11 may set the exception link register ELR_EL3R and the saved processor state register SPSR_EL3R associated with the EL3R exception level to the program counter and PSTATE values read from the Realm's pages in memory, which were previously saved at step 6 as mentioned above. This ensures that when an exception return instruction is subsequently reached in the EL3R exception handler, then instead of returning to exception level EL2 which would normally be the case for an exception taken from EL2, at step 12 when the exception control circuitry 40 restores the PSTATE register 74 and program counter 72 as for a regular exception return, then as the values in the SPSR-EL3R and ELR-EL3R registers 84-3R, 82-3R indicate the values which were previously saved to SPSR_EL2 and ELR_EL2 at step 3, and which therefore will correspond to the processor state and program counter value associated with the application being performed at step 1 before the initial exception is taken, then step 12 causes processing to return back to the initial application, as would have been expected for the exception return instruction encountered at the end of the exception handler executed in EL2 if exception interception had never been enabled. Hence at step 13 processing then returns to originally the executed application and continues as if the initial exception never occurred.

Hence, FIG. 9 illustrates how exception interception and exception return trapping can allow some additional operations to be performed before and after execution of the exception handler for handling an initial exception, by triggering a further exception to a more privileged exception level than the exception level which is the target exception level for the initial exception. Whilst this can be very useful for allowing operations to be performed which cannot be trusted to be performed by the EL2 exception handler itself, this exception intercept model could also be used for other operations, and so it is not essential that the operation performed in the EL3R exception handler includes the realm-based register saving and clearing and restoring as discussed above. The exception handlers executed at EL3 are defined in software and so are not an essential feature of the hardware apparatus. A particular software developer may wish to use the same exception intercept and exception return trapping functionality supported in the architecture for purposes other than the realm control discussed above. For example, if an error is detected in the exception handling code to be executed at a given exception level, then the exception intercept functionality could be used to ensure that some additional operations to patch the error are performed just before that exception handler is executed, or just after execution of the exception handler.

FIG. 10 shows a table illustrating the interaction between the hypervisor trap controls set in the hypervisor control register 94 and the exception intercept controls defined in the exception interception control register 96. FIG. 10 shows different scenarios depending on whether hypervisor trapping is enabled or disabled for an exception targeting EL1 and whether exception interception is enabled or disabled for exceptions targeting EL1.

As shown in the top left example of FIG. 10, when both hypervisor trapping and exception interception are disabled, then the target exception level for this type of execution remains at EL1 and so this type of exception triggers a switch to exception level EL1 and then does not trigger any further exception. Once the relevant exception control registers associated with the exception level EL1 have been populated, the corresponding EL1 exception handler can start.

As shown in the bottom left quadrant of FIG. 10, if exception interception is disabled but hypervisor trapping is enabled for this type of exception, then instead of the target exception level being EL1 as would normally be expected, the hypervisor trap settings override that default assumption and instead the target exception level is EL2 and so in this case the exception is handled in EL2. Note that unlike the exception intercept functionality shown in FIG. 9, when the hypervisor trap setting is enabled, then there is no intervening exception taken to the normal target exception level EL1, and instead, the exception is taken directly to EL2 (the exception control registers for EL2 are populated, not the registers associated with EL1) and the exception is then handled in EL2.

The top right quadrant of FIG. 10 shows the case when exception interception is enabled but the hypervisor trapping is disabled. In this case when an exception having a target exception level of EL1 is encountered, then the exception control registers 80 associated with exception level EL1 are set to indicate the properties of the exception that occurred and/or the processor state at the time the exception occurred, but then before executing the EL1 exception handler a further exception is taken to EL3R. Note how this differs to the bottom left quadrant when hypervisor trapping is enabled, since in the bottom left example there is only one exception taken direct to EL2, whereas in the top right example there are two exceptions, the initial exception to EL1 and then the further exception to EL3R.

Finally, for the bottom right example of FIG. 10, when both hypervisor trapping and exception interception are enabled, then for an exception of a type which would normally be handled at the exception level EL1, the hypervisor trapping indicates that the target exception level should actually be treated as EL2. As exception interception is enabled, for exception level EL2, then having set the EL2 exception control registers 80, a further exception is then taken to EL3R.

Figure 11:
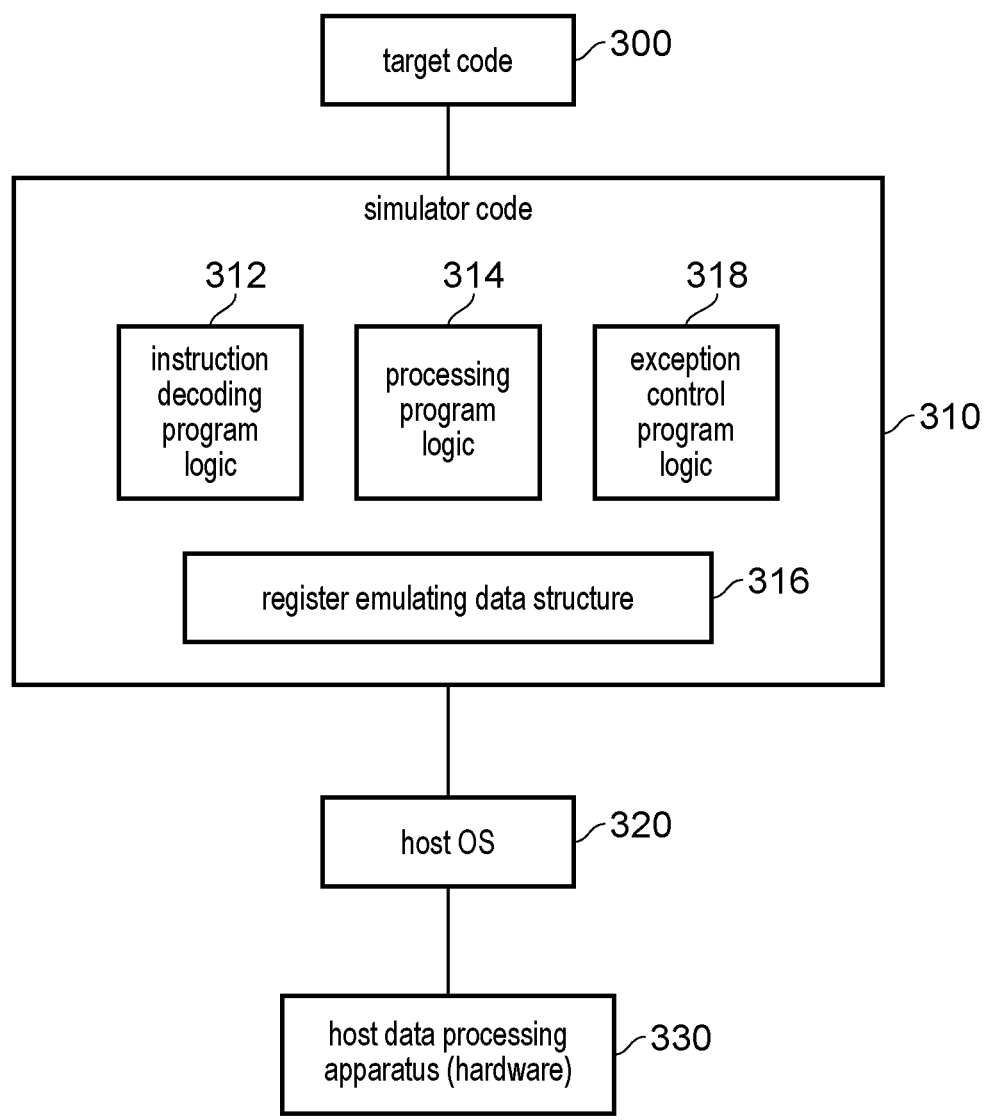
FIG. 11 shows a simulator example that may be used.

FIG. 11 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host data processing apparatus 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host data processing apparatus 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300 may be executed from within the instruction execution environment using the simulator program 310, so that a host data processing apparatus 330 which does not actually have the hardware features of the apparatus 2 discussed above can emulate these features. Hence, the simulator program 310 simulates the presence of target processing circuitry.

The simulator code 310 includes instruction decoding program logic 312, processing program logic 314 and exception control program logic 318 which correspond in functionality to the instruction decoder 10, processing circuitry and exception control circuitry 40 discussed above. Also, a register emulating data structure 316 may be maintained by the simulator code 310 to emulate the registers 14 provided in the instruction set architecture of the target processor which is simulated by the simulator code 310. For example, the register emulating data structure 316 may be stored in the memory of the host data processing apparatus and may include storage locations which store data corresponding to the registers 14, including registers 70, 72, 74, 76, 80, 94, 96 as shown in FIG. 3. The exception control program logic 318 may respond to a simulated exception targeting the target processor represented by the simulator code 310 in a corresponding way to the response to an exception by the exception control circuitry 40 described above, including controlling the exception interception functionality based on an emulated version of the EICR_EL3R register 96, and control of trapping of exception return instructions, in an analogous way to discussed above. Hence, the simulator code 310 may provide similar advantages to those achieved on the physical hardware implementation of the processing apparatus 2 described in the earlier examples.

Hence, a computer program may be provided for controlling a host data processing apparatus 330 to simulate processing of a target program 300 by target processing circuitry capable of performing data processing in one of a plurality of exception levels; the computer program comprising: processing program logic 314 to control the host data processing apparatus to simulate processing of the target program by the target processing circuitry; and exception control program logic 318 to control the host data processing apparatus to simulate exception handling for the target processing circuitry; in which: in response to an initial exception occurring when the target processing circuitry is in a given exception level, where the initial exception is to be handled by the target processing circuitry in a target exception level, the exception control program logic 318 is configured to control the host data processing apparatus 330 to: store exception control information to at least one exception control storage location 316 associated with the target exception level, where the exception control information is indicative of at least one property of the initial exception or of processor state of the target processing circuitry at a time the initial exception occurred; and when at least one exception intercept configuration parameter stored in a configuration storage location indicates that exception interception is enabled: after storing the exception control information to the at least one exception control storage location in response to the initial exception, and before starting simulation of the target processing circuitry processing an exception handler for handling the initial exception in the target exception level, simulate triggering of a further exception to be handled by the target processing circuitry in a predetermined exception level.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
processing circuitry to perform data processing in one of a plurality of exception levels; and
exception control circuitry to control exception handling for the processing circuitry; in which:
in response to an initial exception occurring when the processing circuitry is in a given exception level, where the initial exception is to be handled by the processing circuitry in a target exception level, the exception control circuitry is configured to:
store exception control information to at least one exception control register associated with the target exception level, where the exception control information is indicative of at least one property of the initial exception or of processor state of the processing circuitry at a time the initial exception occurred; and
in response to determining that at least one exception intercept configuration parameter stored in a configuration register indicates that exception interception is enabled:
after storing the exception control information to the at least one exception control register in response to the initial exception, and before controlling the processing circuitry to start processing of an exception handler for handling the initial exception in the target exception level, trigger a further exception to be handled by the processing circuitry in a predetermined exception level different from the target exception level.

2. The apparatus according to claim 1, in which the at least one exception intercept configuration parameter is programmable when the processing circuitry is in a restricted subset of exception levels including the predetermined exception level, and is read-only when in an exception level other than said restricted subset.

3. The apparatus according to claim 2, in which said restricted subset of exception levels consists of the predetermined exception level.

4. The apparatus according to claim 1, in which the predetermined exception level is a most privileged exception level.

5. The apparatus according to claim 1, in which the at least one exception intercept configuration parameter comprises a global disable parameter, and when the global disable parameter has a predetermined value, said exception interception is disabled for all exception levels.

6. The apparatus according to claim 1, in which the at least one exception intercept configuration parameter comprises at least one exception-level-specific enable parameter indicative of a subset of exception levels for which said exception interception is enabled.

7. The apparatus according to claim 6, in which the at least one exception-level-specific enable parameter specifies a threshold exception level;
said exception interception is enabled for exceptions for which the target exception level is said threshold exception level or a more privileged exception level than the threshold exception level, other than said predetermined exception level; and
said exception interception is disabled for exceptions for which the target exception level is a less privileged exception level than said threshold exception level.

8. The apparatus according to claim 6, in which the at least one exception-level-specific enable parameter comprises a plurality of enable indicators each associated with a respective exception level other than the predetermined exception level, each enable indicator indicating whether said exception interception is enabled or disabled for exceptions for which the target exception level is the exception level associated with that enable indicator.

9. The apparatus according to claim 1, in which in response to an exception return instruction processed by the processing circuitry when a current exception level is an exception level other than the predetermined exception level:
when an exception return trap configuration parameter stored in a configuration register specifies that exception return trapping is enabled, the exception control circuitry is configured to control the processing circuitry to switch to processing in the predetermined exception level.

10. The apparatus according to claim 9, in which in response to the exception return instruction processed when the current exception level is the exception level other than the predetermined exception level, when the exception return trap configuration parameter stored in the configuration register specifies that exception return trapping is disabled, the exception control circuitry is configured to control the processing circuitry to switch to processing in an exception level indicated in at least one exception control register associated with the current exception level.

11. The apparatus according to claim 9, in which the exception return trap configuration parameter is programmable only in the predetermined exception level.

12. The apparatus according to claim 1, in which the exception control information stored to the at least one exception control register comprises one or more members selected from the group consisting of:
- a return program counter indicative of a program instruction address to which processing should return following handling of the initial exception;
- information indicative of the given exception level;
- information indicative of a current mode of operation of the processing circuitry when the initial exception occurred; and
- information indicative of a cause of the initial exception.

13. The apparatus according to claim 1, in which in response to the further exception, the exception control circuitry is configured to store further exception control information to at least one further exception control register associated with the predetermined exception level, where the further exception control information is indicative of at least one property of the further exception or of processor state of the processing circuitry at the time the further exception occurred.

14. The apparatus according to claim 13, in which the further exception control information comprises an indication that the further exception is an exception intercept type of exception triggered because exception interception was enabled for the initial exception.

15. A method comprising:
- performing data processing in a given exception level of a plurality of exception levels supported by processing circuitry; and
- in response to an initial exception occurring when the processing circuitry is in the given exception level, where the initial exception is to be handled by the processing circuitry in a target exception level:
  - storing exception control information to at least one exception control register associated with the target exception level, where the exception control information is indicative of at least one property of the initial exception or of processor state of the processing circuitry at a time the initial exception occurred; and
  - in response to determining that at least one exception intercept configuration parameter stored in a configuration register indicates that exception interception is enabled:
    - after storing the exception control information to the at least one exception control register in response to the initial exception, and before controlling the processing circuitry to start processing of an exception handler for handling the initial exception in the target exception level, triggering a further exception to be handled by the processing circuitry in a predetermined exception level different from the target exception level.

16. A non-transitory storage medium storing a computer program for controlling a host data processing apparatus to simulate processing of a target program by target processing circuitry capable of performing data processing in one of a plurality of exception levels; the computer program comprising:
- processing program logic to control the host data processing apparatus to simulate processing of the target program by the target processing circuitry; and
- exception control program logic to control the host data processing apparatus to simulate exception handling for the target processing circuitry; in which:
- in response to an initial exception occurring when the target processing circuitry is in a given exception level, where the initial exception is to be handled by the target processing circuitry in a target exception level, the exception control program logic is configured to control the host data processing apparatus to:
  - store exception control information to at least one exception control storage location associated with the target exception level, where the exception control information is indicative of at least one property of the initial exception or of processor state of the target processing circuitry at a time the initial exception occurred; and
  - in response to determining that at least one exception intercept configuration parameter stored in a configuration storage location indicates that exception interception is enabled:
    - after storing the exception control information to the at least one exception control storage location in response to the initial exception, and before starting simulation of the target processing circuitry processing an exception handler for handling the initial exception in the target exception level, simulate triggering of a further exception to be handled by the target processing circuitry in a predetermined exception level different from the target exception level.

* * * * *